United States Patent

Haendle et al.

[11] Patent Number: 4,658,410
[45] Date of Patent: Apr. 14, 1987

[54] STEREO X-RAY SUBTRACTION APPARATUS

[75] Inventors: Jörg Haendle, Erlangen; Wolfgang Maass, Nuremberg, both of Fed. Rep. of Germany

[73] Assignee: Siemens Aktiengesellschaft, Berlin and Munich, Fed. Rep. of Germany

[21] Appl. No.: 660,373

[22] Filed: Oct. 12, 1984

[30] Foreign Application Priority Data

Nov. 14, 1983 [DE] Fed. Rep. of Germany ....... 3341215

[51] Int. Cl.$^4$ .......................... A61B 6/02; H05G 1/64; H04N 5/32
[52] U.S. Cl. ....................................... 378/41; 378/99; 358/111
[58] Field of Search .................... 358/88, 111; 378/99, 378/41

[56] References Cited

U.S. PATENT DOCUMENTS

| 4,064,530 | 12/1977 | Kaiser et al. | 358/36 |
| 4,350,998 | 9/1982 | Verhoeven | 358/111 |
| 4,507,681 | 3/1985 | Verhoeven et al. | 358/111 |
| 4,578,802 | 3/1986 | Itoh | 378/41 |

FOREIGN PATENT DOCUMENTS

| 0088356 | 9/1983 | European Pat. Off. |
| 1762875 | 10/1970 | Fed. Rep. of Germany |
| 0085181 | 6/1980 | Japan ................................. 358/111 |

Primary Examiner—Janice A. Howell
Attorney, Agent, or Firm—Hill, Van Santen, Steadman & Simpson

[57] ABSTRACT

A stereo X-ray subtraction apparatus has a stereo X-ray system and an X-ray image intensifier television chain in which, for each channel, the video signals of successive stereo partial images are summed in a weighted fashion in a first image memory, the output of the first image memory being supplied to a first input of a first subtraction stage, with the output of the first image memory in the other channel being supplied to a second input of the first subtraction stage, the output of the first subtraction stage being supplied to a second image memory and to a first input of a second subtraction stage, and the output of the second image memory being supplied to a second input of the second subtraction stage. The outputs of the second subtraction stages for each channel are supplied to a display unit for displaying the resulting stereo image.

8 Claims, 2 Drawing Figures

STEREO X-RAY SUBTRACTION APPARATUS

BACKGROUND OF THE INVENTION

Field of the Invention

The present invention relates to X-ray devices, and in particular to a stereo X-ray subtraction apparatus.

A stereo X-ray installation is known from European Patent application No. A-0088356 which has a stereo X-ray tube having foci which are alternately activated. Two X-ray beams are thus generated from the two foci disposed at a small distance from each other, the central rays of the X-ray beams intersecting in the radiography plane. The resulting image is supplied to an X-ray image intensifier, having an inlet fluorescent screen on which the radiation images, generated in chronological succession by both foci, appear. The output of the X-ray image intensifier is intensified to a television camera for displaying the resulting image. A central control unit for controlling the television chain, including a processing circuit with image storage means for storage of X-ray stereo television images is supplied. The processing circuit also includes subtraction stages for undertaking subtraction from a stored video signal and signal chronologically following the stored video signal. Stereo X-ray devices of this type are employed in order to spatially view X-ray images for the purpose of, for example, precisely monitoring the insertion and positioning of a catheter in a subject.

The stereo installation disclosed in the aforementioned European patent application irradiates the subject from various directions. The radiation images striking the inlet fluorescent screen of the X-ray image intensifier are detected by a television camera and are alternatingly read into two image memories in the processing circuitry, such that radiographs without a contrast agent are stored in a first memory pair, and subsequently subtraction radiographs are stored in a second memory pair. The memory contents are supplied to a stereo display device for viewing by an Examiner.

A problem in the use of such stereo technology is that in a video signal of a stereo partial image, residual information from the preceding other stereo partial image exists. This may be present in an amount up to 30%, so that the residual information is a substantial source of interference for the following subtraction operation.

A noise reduction system for a television installation is disclosed in U.S. Pat. No. 4,064,530 wherein an image is averaged over several scannings by means of recursive filtering, the averaged image being read into a memory. For this purpose, a current video signal is multiplied by a factor (1−a) and the stored video signal is multiplied by a factor a. The current video signal is thus attenuated and superimposed with the also attenuated stored video signals so that the noise, for example, introduced by a television system is reduced, as well as the quantum noise.

SUMMARY OF THE INVENTION

It is an object of the present invention to provide a stereo X-ray apparatus which makes use of a stereo subtraction technique by means of which interfering signals, particularly cross-talk between stereo channels, are suppressed.

The above object is inventively achieved in a stereo X-ray apparatus having an X-ray source with two beam foci disposed a short distance apart for generating an X-ray image which is supplied to an X-ray image intensifier having a means for generating video signals from the X-ray image. The video signals of successive stereo partial images are summed in a weighted fashion in each channel for a first image memory. The output of the first image memory in each channel is supplied to a first input of a first subtraction stage, the first subtraction stage having a second input to which the output of the first image memory in the other stereo channel is supplied. The output of the first subtraction stage in each channel is supplied to a second image memory and to a first input of a second subtraction stage. The second subtraction stage has a second input to which the output of the second image memory is conducted. A stereo display unit is connected to the outputs of each second subtraction stage. A stereo subtraction image is thus achieved including only four image memories, two circuits for integration, and four subtraction stages.

The weighted summation or integration can be undertaken in a simple manner by means of a circuit for each stereo channel having a first multiplication stage receiving the input video signal from the image intensifier, a second multiplication stage having an input connected to the output of the first image memory, and an adder having inputs connected to the outputs of the multiplication stages, and an output connected to the input of the first image memory. The current video signal is multiplied in the first multiplication stage by a factor k, and the output signal of the image memory is in the second multiplication stage multiplied by a factor (1−k). The first image memory in each channel may be employed as a standard converter if the input frequency thereof is smaller than its output image frequency. Compensation of residual data of the preceding stereo partial image in the current video signal can be achieved in one embodiment by the use of a characteristic curve memory interconnected between the output of each first image memory and the second input of each second subtraction stage. The characteristic curve memories respectively associated with each channel attenuate the input signal according to the curve stored therein.

DESCRIPTION OF THE PREFERRED EMBODIMENTS

Figure 1:
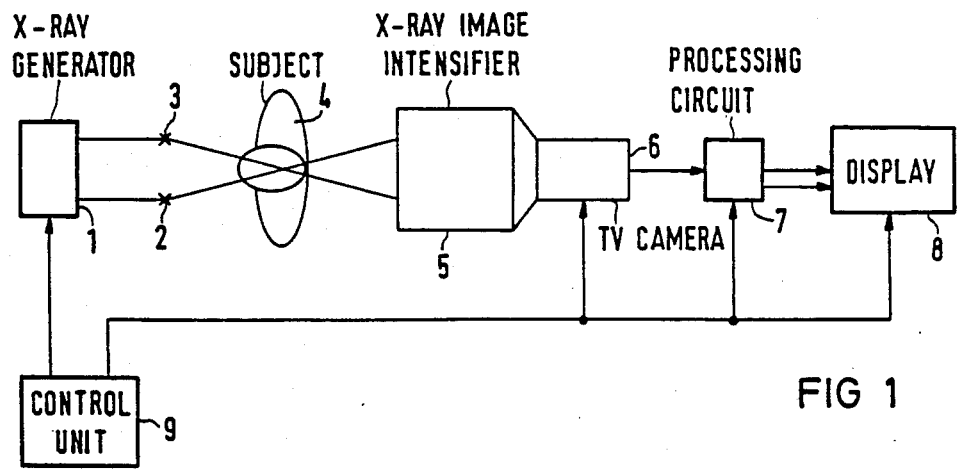
FIG. 1 is a schematic block diagram of a stereo X-ray subtraction apparatus constructed in accordance with the principles of the present invention.

A stereo X-ray subtraction apparatus constructed in accordance with the principles of the present invention is shown in FIG. 1. The apparatus includes an X-ray generator 1 for generating a high voltage for two schematically represented foci 2 and 3. The X-ray generator 1 may consist of two X-ray tubes, or a single X-ray tube with two foci. The X-rays penetrate a radiography subject 4, intersecting in the radiography plane, and generate a radiography image on the inlet florescent screen of an X-ray image intensifier 5. The X-ray image intensifier 5 has a television camera 6 for converting the stereo image reproduced on the output fluorescent screen into video signals. The video signals of the TV camera 6 are supplied to a processing circuit 7. The stereo output signals of the processing circuit 7 are supplied to a stereo display unit 8. The sequences and synchronization of the X-ray generator 1, the television camera 6, the processing circuit 7, and the stereo display unit 8 are controlled by a central control unit 9 connected to each of those elements.

The apparatus shown in FIG. 1 operates as follows. Under the control of the control unit 9, the focus 2, for example, is first activated by the X-ray generator 1 which emits a radiation beam in the direction of the radiography subject 4 which forms a radiation image on the inlet fluorescent screen of the X-ray image intensifier 5. The first, for example, right, stereo image is received by the television camera 6 from the output fluorescent screen of the X-ray image intensifier 5, and is supplied to the processing circuit 7. After this transmission is completed, the focus 3 is activated which emits a second radiation beam having central rays which intersect those of the first radiation beam in the radiography plane, that is, within the radiography subject 4. The radiation image detected by the X-ray image intensifier 5 and the television camera 6 is supplied as the other, for example, left, stereo partial image to the processing circuit 7.

Figure 2:
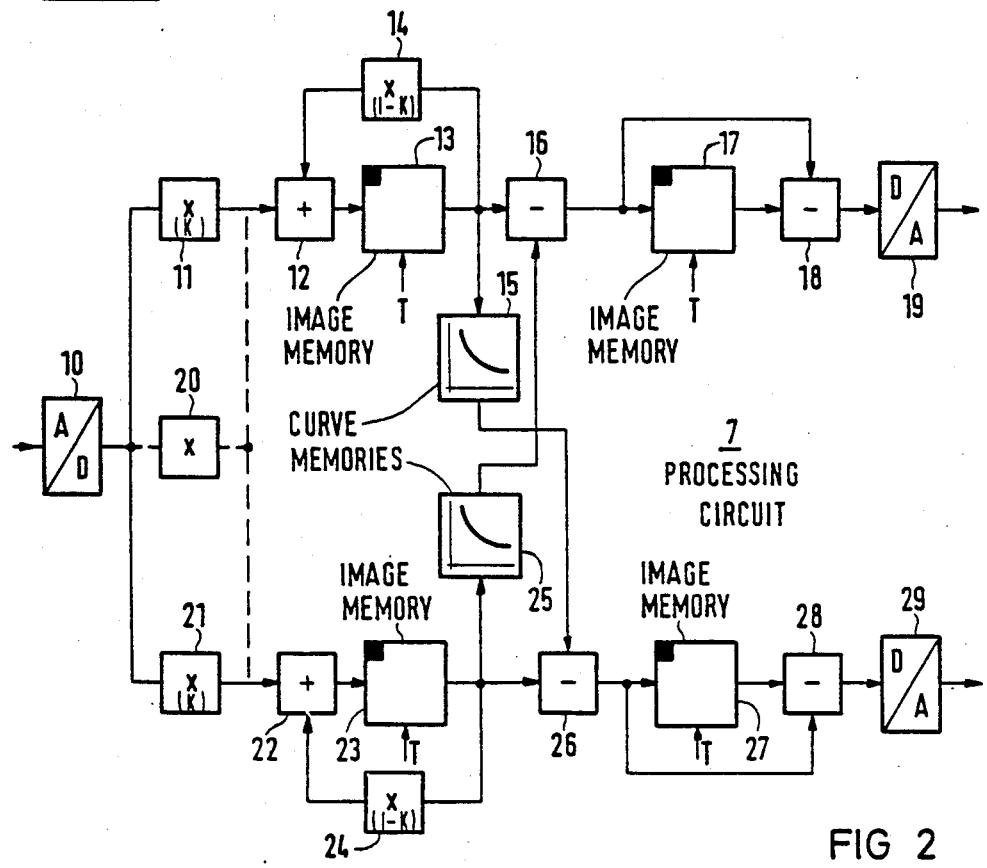
FIG. 2 is a schematic block diagram of a processing circuit for use in the apparatus shown in FIG. 1.

The details of the processing circuit 7 are shown in a sample embodiment in FIG. 2. The circuit 7 includes an analog-to-digital converter 10 which receives the video signals from the TV camera 6. The output of the converter 10 is supplied to each of two first multiplication stages 11 and 21 in the respective stereo channels. The outputs of the multiplication stages 11 and 21 are respectively supplied to first inputs of adders 12 and 22. The output signals of the adders 12 and 22 are respectively supplied to first image memories 13 and 23, wherein those signals are stored. The outputs of the memories 13 and 23 are fed back to the respective adders 12 and 22 by respective second multiplication stages 14 and 24. In the first multiplication stages 11 and 21 the current video signal from the television camera 6 is multiplied by a factor k, whereas the feedback signal from the first image memories 13 and 23 is multiplied by a factor $(1-k)$. The two weighted signals are added in the adders 12 and 22 and again supplied to the respective first image memories 13 and 23. A video signal, integrated over several images, is thereby obtained for a low-noise X-ray stereo image.

The outputs of the first image memories 13 and 23 are respectively supplied to first inputs of first subtraction stages 16 and 26. The subtraction stages 16 and 26 each have second inputs to which the output of the image memory in the other stereo channel is supplied through an attenuation means. The output of the first image memory 13 is supplied to the second input of the first subtraction stage 26 through an attenuation means in the form of a curve memory 15, and the output of the first image memory 23 is supplied to the second input of the first subtraction stage 16 through an attenuation means in the form of a curve memory 25. The curve memories 15 and 25 each have characteristic curves stored therein in which the amplitude dependency of the behavior of the television tube in the TV camera 6 is stored. The residual signal (contained in the video signal) of the preceding image, which, in dependence upon the brightness of the preceding image, is contained with a varying component as a ghost image in the current stereo partial image, is thus entirely eliminated from the latter.

The video signals of each channel, thus freed of spurious signals, are respectively supplied to second image memories 17 and 27 and to first inputs of respective second subtraction stages 18 and 28. The outputs of the second subtraction stages 18 and 28 are supplied to respective digital-to-analog converters 19 and 29, the outputs of which form the outputs of the processing circuit 7 and which are supplied to the stereo display unit 8. The stereo display unit 8 may be a conventional unit, for example, including a monitor to which the stereo partial images are successively supplied which exhibits a rotating shutter by means of which the stereo partial images are combined in the eye of the viewer. The display device 8 may also be in the form of two monitors provided with polarization filters having polarization directions which are 90° out of phase, with the outputs of the filters being combined in a semi-transmissive mirror. The viewer views the stereo images by the use of polarizing glasses.

Control and sequencing signals T are supplied to each of the image memories 13, 17, 23 and 27 as indicated.

The above-described stereo X-ray apparatus may be employed in the so-called path finder technique if radiographs obtained after a sample trial are read into the second image memories 17 and 27 instead of blank images. In a known manner, these stored radiographs are negatively superimposed with the current fluoroscopy image in the second subtraction devices 18 and 28, whereby the output signals of the second image memories 17 and 27 are attenuated. By this technique a fluoroscopy image can be shown on the stereo display device 8 in which particular items, such as blood vessels, of interest can be emphasized by the subtraction operation, those vessels appearing as bright paths and facilitating insertion of a catheter. Attenuation of the video signal contained in the second image memories 17 and 27 may thus proceed either in the output circuits of the image memories or in the subtraction stage following the memory. For this purpose a circuit may be provided between the second image memory 17 and 27 and the second subtraction stages 18 and 28 which permits adjustment of this attenuation.

The factor k employed in the multiplication stages 11, 21, 14 and 24 may be varied in dependence upon movements which may occur, so that the number of images may be altered over which the integration is taken. In the normal instance the factor k may, for example, assume a value of 1/16, so that integration is undertaken over approximately 16 images. In the case of rapid or large movements, or in cases wherein no integration is to take place, the factor k may assume the value of 1. Moreover, a single multiplication stage 20 as shown in FIG. 2 may be employed in place of the two first multiplication stages 11 and 21. Use of a single multiplication stage 20, however, does not permit separate adjustment of the factors k for each channel.

Although modifications and changes may be suggested by those skilled in the art it is the intention of the inventor to embody within the patent warranted hereon all changes and modifications as reasonably and properly come within the scope of his contribution to the art.

We claim as our invention:

1. In a stereo X-ray apparatus having a means for generating two X-ray beams directed at an examination subject, an X-ray image intensifier, a video means for generating a video signal from said X-ray image intensifier consisting of alternating signals from said two X-ray beams, and a stereo display means, the improvement of a processing circuit having two stereo channels interconnected between said video means and said stereo display means comprising for each stereo channel:

a means for weighting and summing successive video signals received from said video means;

a first storage means for storing the weighted and summed video signals;

a first subtraction means having a first input connected to the output of said first storage means and a second input connected to the output of the first storage means in the other stereo channel for forming a difference between the signals at said first and second inputs;

a second storage means connected to the output of the first subtraction means; and a second subtraction means having a first input connected to the output of said second storage means and a second input connected to the output of said first subtraction means for forming a difference between the signals at said first and second inputs, and having an output connected to said stereo display means.

2. The improvement of claim 1 wherein said means for weighting and summing comprises:

a first multiplier means connected to said video means for receiving said video signals therefrom;

a second multiplier means having an input connected to an output of said first storage means; and an adder having a first input connected to the output of said first multiplier means and a second input connected to the output of said second multiplier means, and an output connected to an input of said first storage means.

3. The improvement of claim 2 wherein said first multiplier means consists of two multiplier stages respectively connected in each stereo channel.

4. The improvement of claim 2 wherein said first multiplier means consists of a single multiplier stage common to both stereo channels.

5. The improvement of claim 2 wherein each of said first and second multiplier means has a different weighting factor.

6. The improvement of claim 2 wherein said first multiplier means has a constant weighting factor and wherein said second multiplier means has a weighting factor of one minus said constant weighting factor.

7. The improvement of claim 1 wherein said first storage means has an input image frequency and an output image frequency, and wherein said input image frequency is less than said output image frequency.

8. The improvement of claim 1 wherein said processing circuit further comprises for each stereo channel a characteristic curve memory interconnected between the output of a first storage means in one of said channels and said second input of said first subtraction means in the other of said stereo channels for attenuating a signal at the output of said first storage means.

* * * * *